(12) United States Patent
Yamamoto (10) Patent No.: US 12,308,464 B2
(45) Date of Patent: May 20, 2025

(54) ENERGY STORAGE APPARATUS

(71) Applicant: GS Yuasa International Ltd., Kyoto (JP)

(72) Inventor: Yuichiro Yamamoto, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 561 days.

(21) Appl. No.: 17/636,679

(22) PCT Filed: Jul. 15, 2020

(86) PCT No.: PCT/JP2020/027545
§ 371 (c)(1),
(2) Date: Feb. 18, 2022

(87) PCT Pub. No.: WO2021/044739
PCT Pub. Date: Mar. 11, 2021

(65) Prior Publication Data
US 2022/0285783 A1 Sep. 8, 2022

(30) Foreign Application Priority Data
Sep. 3, 2019 (JP) .................. 2019-160244

(51) Int. Cl.
*H01M 50/298* (2021.01)
*H01M 10/42* (2006.01)
(Continued)

(52) U.S. Cl.
CPC ..... *H01M 50/298* (2021.01); *H01M 10/4257* (2013.01); *H01M 50/24* (2021.01); *H01M 50/271* (2021.01)

(58) Field of Classification Search
CPC .......... H01M 50/298; H01M 10/4257; H01M 50/24; H01M 50/271; H01M 10/425;
(Continued)

(56) References Cited

U.S. PATENT DOCUMENTS

| | | | |
|---|---|---|---|
| 2011/0052951 A1 | 3/2011 | Yang et al. | |
| 2012/0237808 A1* | 9/2012 | Yang .................. | H01M 50/298 |
| | | | 429/90 |

(Continued)

FOREIGN PATENT DOCUMENTS

| | | | |
|---|---|---|---|
| JP | 2008-243412 A | 10/2008 | |
| JP | 2012-523084 A | 9/2012 | |

(Continued)

OTHER PUBLICATIONS

International Search Report (Isr) (PCT Form PCT/ISA/210), in PCT/JP2020/027545, dated Sep. 24, 2020.

*Primary Examiner* — Abdullah A Riyami
*Assistant Examiner* — Nader J Alhawamdeh
(74) *Attorney, Agent, or Firm* — MCGINN I.P. LAW GROUP, PLLC (57) ABSTRACT

An energy storage apparatus includes: an energy storage device unit having at least one energy storage device; an electric device electrically connected to the energy storage device unit, an electric wire, and a restriction part. The electric wire is connected to the electric device via a connector. The restriction part restricts a posture of a protruding portion, which is a portion of the electric wire protruding from the connector, to a posture inclined downward from the connector.

20 Claims, 5 Drawing Sheets

(51) Int. Cl.
*H01M 50/24* (2021.01)
*H01M 50/271* (2021.01)

(58) Field of Classification Search
CPC .......... H01M 2220/20; H01M 50/251; H01M 50/209; H01M 50/507; Y02E 60/10; H01G 2/02; H01G 11/10; H01G 11/76; H01G 11/78
See application file for complete search history.

(56) References Cited

U.S. PATENT DOCUMENTS

| | | | |
|---|---|---|---|
| 2016/0254515 A1 | 9/2016 | Shimoda et al. | |
| 2018/0090734 A1* | 3/2018 | Tsuruta | H01M 50/209 |
| 2018/0130989 A1* | 5/2018 | Saito | H01M 50/51 |
| 2019/0288447 A1 | 9/2019 | Shimizu et al. | |
| 2022/0285783 A1* | 9/2022 | Yamamoto | H01M 50/507 |
| 2023/0275327 A1* | 8/2023 | Nakamura | H01M 50/209 |
| | | | 429/158 |
| 2023/0317957 A1* | 10/2023 | Yamatani | H01M 10/04 |
| | | | 429/94 |
| 2024/0055700 A1* | 2/2024 | Okabe | H01M 10/658 |
| 2024/0120762 A1* | 4/2024 | Narimoto | H01M 10/46 |
| 2024/0145816 A1* | 5/2024 | Kadota | H01M 10/052 |

FOREIGN PATENT DOCUMENTS

| | | | |
|---|---|---|---|
| JP | 2013-161556 A | | 8/2013 |
| JP | 2014203770 A | * | 10/2014 |
| JP | 2015-069943 A | | 4/2015 |
| JP | 2015-111537 A | | 6/2015 |
| JP | 2015-138605 A | | 7/2015 |
| JP | 2015-179644 A | | 10/2015 |
| JP | 2016-062840 A | | 4/2016 |
| JP | 2016081875 A | * | 5/2016 |
| JP | 2017-123280 A | | 7/2017 |
| JP | 2018-037183 A | | 3/2018 |
| JP | 2018-191384 A | | 11/2018 |
| WO | WO 2016/175180 A1 | | 11/2016 |
| WO | WO 2018/096931 A1 | | 5/2018 |

* cited by examiner

ENERGY STORAGE APPARATUS

TECHNICAL FIELD

The present invention relates to an energy storage apparatus including an electric device.

BACKGROUND ART

Patent Document 1 discloses a battery module including a plurality of battery cells. A battery module includes: a metal lead having a plate-shaped part and an erected part fixed between terminals of two adjacent battery cells; and a wiring board provided with a wiring pattern extending from an insertion hole into which the erected part of the metal lead is inserted. The erected part of the metal lead is provided with a reinforcement part that is in contact with the lower surface of the wiring board to support the wiring board, and at least a part of a fuse is disposed above a position where the reinforcement part of the metal lead supports the wiring board.

PRIOR ART DOCUMENT

Patent Document

Patent Document 1: JP-A-2017-123280

SUMMARY OF THE INVENTION

Problems to be Solved by the Invention

When a rigid metal body is used as a conductive member connected to an electric device such as a wiring board as in the above conventional battery module, a structure for supporting the electric device by using the conductive member is possible. However, in this case, the conductive member becomes relatively large or thick, and its weight also becomes relatively large. Further, one of two members connected by the conductive member is easily affected by the movement of the other. Examples of the electric device provided in the energy storage apparatus include a control device and a relay, and in these electric devices, it is necessary to provide a plurality of conduction paths for electrically connecting with other members. Therefore, as a member forming each of these conduction paths, an electric wire coated with a resin having electrical insulation may be used. Specifically, a connector (also referred to as a connector plug or a plug) is provided at the end of the electric wire, and by inserting the connector into a socket provided in the electric device, the electric device and another electric device or the like are connected electrically.

In this case, the electric wire is relatively lightweight and having high flexibility, so that the degree of freedom in the posture thereof is high. Hence the electric wire applies a small mechanical load to the electric device connected via the connector. On the other hand, since the electric wire has high flexibility, a portion close to the connector (a portion protruding from the connector) can take various postures. For this reason, for example, when dew condensation occurs in the electric wire, the water droplet enters into the connector along the electric wire, which may cause a defect of the electric device.

The present invention has been made by the inventor of the present application newly focusing on the above problem, and an object of the present invention is to provide an energy storage apparatus including an electric device and having improved reliability.

Means for Solving the Problems

An energy storage apparatus according to one aspect of the present invention includes: an energy storage device unit including at least one energy storage device; an electric device electrically connected to the energy storage device unit; an electric wire connected to the electric device via a connector; and a restriction part that restricts a posture of a protruding portion of the electric wire, the protruding portion being a portion protruding from the connector, to a posture inclined downward from the connector.

Advantages of the Invention

According to the present invention, it is possible to provide an energy storage apparatus including an electric device and having improved reliability.

MODE FOR CARRYING OUT THE INVENTION

An energy storage apparatus according to one aspect of the present invention includes: an energy storage device unit including at least one energy storage device; an electric device electrically connected to the energy storage device unit; an electric wire connected to the electric device via a connector; and a restriction part that restricts a posture of a protruding portion of the electric wire, the protruding portion being a portion protruding from the connector, to a posture inclined downward from the connector.

With this configuration, the posture of the protruding portion of the electric wire connected to the electric device can be inclined downward from the connector. Thus, for example, even when dew condensation occurs in the energy storage apparatus, and the water droplet adheres to the electric wire, it is difficult for the water droplet to reach the connector. As a result, the possibility of the occurrence of a defect due to water entering the connector is reduced. As described above, the energy storage apparatus according to the present aspect is an energy storage apparatus with improved reliability.

In the electric device, a plurality of the electric wires may be connected to the electric device via the connector, and the restriction part may collectively restrict a posture of the protruding portion of each of the plurality of electric wires to a posture inclined downward.

With this configuration, when dew condensation occurs in the energy storage apparatus, it is possible to prevent water droplets, which tend to become large due to the gathering of the electric wires, from approaching the connector along these electric wires. Therefore, in a state where a plurality of electric wires is connected to one connector, the possibility of the occurrence of a defect caused by dew condensation can be reduced with a simple configuration.

A water reception part made of a non-metal may be disposed below an end of the protruding portion of the electric wire on a side opposite to the connector.

With this configuration, when a water droplet adheres to the protruding portion close to the connector of the electric wire, and the water droplet moves along the protruding portion in a posture inclined downward and falls from the electric wire, the water droplet is received by the non-metallic water reception part. Accordingly, in the inside of the energy storage apparatus, the possibility of corrosion of the metal member caused by water droplets is reduced. This also contributes to an improvement in the reliability of the energy storage apparatus.

The energy storage apparatus may further include a cover member that covers the electric device and the electric wire from above, and the restriction part may be disposed on the cover member and presses the protruding portion of the electric wire from above to restrict the posture of the protruding portion to a posture inclined downward.

With this configuration, the posture of the protruding portion of the electric wire is restricted to the posture inclined downward by the work of placing the cover member. That is, for example, only by disposing the cover member that is a lid body of an outer case, it is possible to obtain an effect of reducing the occurrence of a defect caused by dew condensation in the energy storage apparatus.

The energy storage apparatus may further include: a plate-shaped member disposed to partition the electric device and the energy storage device unit from each other; and an opening cover that covers an opening that is formed in the plate-shaped member and that exposes a part of the energy storage device unit, and the restriction part may be disposed on a surface of the opening cover on a side of the electric device.

With such a configuration, the restriction part is formed on the opening cover, so that the restriction part can be stably fixed in the inside of the energy storage apparatus. It is possible to do work of joining a busbar to the electrode terminal via the opening provided in the plate-shaped member and further to dispose the electric wire restricted in the posture for reducing the defect by using the space used in the joining work.

In the energy storage apparatus, the energy storage apparatus may include a plurality of the electric devices, and the electric wire may be disposed to connect two of the plurality of the electric devices.

With this configuration, the posture of the electric wire connecting at least two electric devices to each other is restricted by the restriction part. That is, one restriction part can reduce the arrival of a water droplet at the connector connected to each of at least two electric devices. Therefore, the plurality of connectors and the electric device can be efficiently protected from water droplets with a simple configuration.

Hereinafter, an energy storage apparatus according to an embodiment of the present invention (including a modification thereof) will be described with reference to the drawings. An embodiment described below illustrates a comprehensive or specific example. Numerical values, shapes, materials, components, placement positions of the components, connection forms, and the like shown in the embodiment below are merely examples and are not intended to limit the present invention. In each figure, dimensions and the like are not illustrated strictly.

In the following description and drawings, a direction in which a plurality of energy storage devices are arranged, a direction in which the long side surfaces of cases of the energy storage devices face each other, or the thickness direction of the case is defined as an X-axis direction. A direction in which electrode terminals are arranged in one energy storage device or a direction in which the short side surfaces of the cases of the energy storage devices face each other is defined as a Y-axis direction. A direction in which a body and a lid body in an outer case of an energy storage apparatus are disposed, a direction in which the energy storage devices and busbars are arranged, or a vertical direction is defined as a Z-axis direction. The X-axis direction, Y-axis direction, and Z-axis direction are directions intersecting (orthogonal to, in the present embodiment and the modification thereof) each other. It is conceivable that the Z-axis direction may not be the vertical direction depending on the use aspect, but for convenience of description, a description will be given below with the Z-axis direction as the vertical direction.

In the following embodiments, expressions indicating relative directions or postures, such as parallel and orthogonal, may be used, but strictly speaking, these expressions also include a case where these expressions are not the directions or postures. For example, two directions being orthogonal to each other not only means that an angle formed by the two directions is 90°, but also means that the two directions are substantially orthogonal to each other, that is, the two directions being orthogonal includes a difference of, for example, about several percent. In the following description, for example, the plus side in the X-axis direction indicates the arrow direction side of the X-axis, and the minus side in the X-axis direction indicates the opposite side to the X-axis direction plus side.

The same applies to the Y-axis direction and the Z-axis direction.

Embodiment

[1. General Description of Energy Storage Apparatus]

Figure 1:
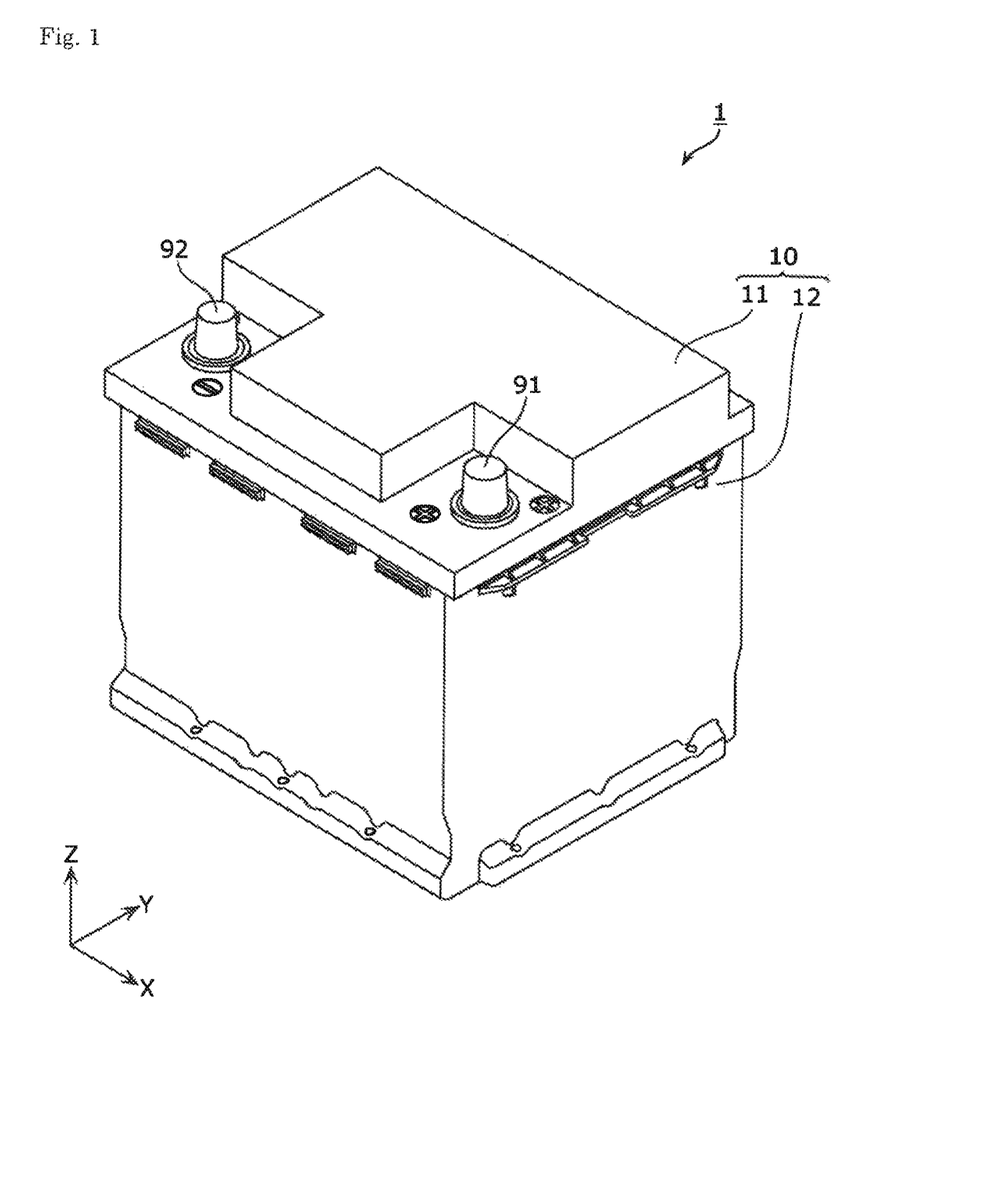
FIG. 1 is a perspective view illustrating an appearance of an energy storage apparatus according to an embodiment.
Figure 2:
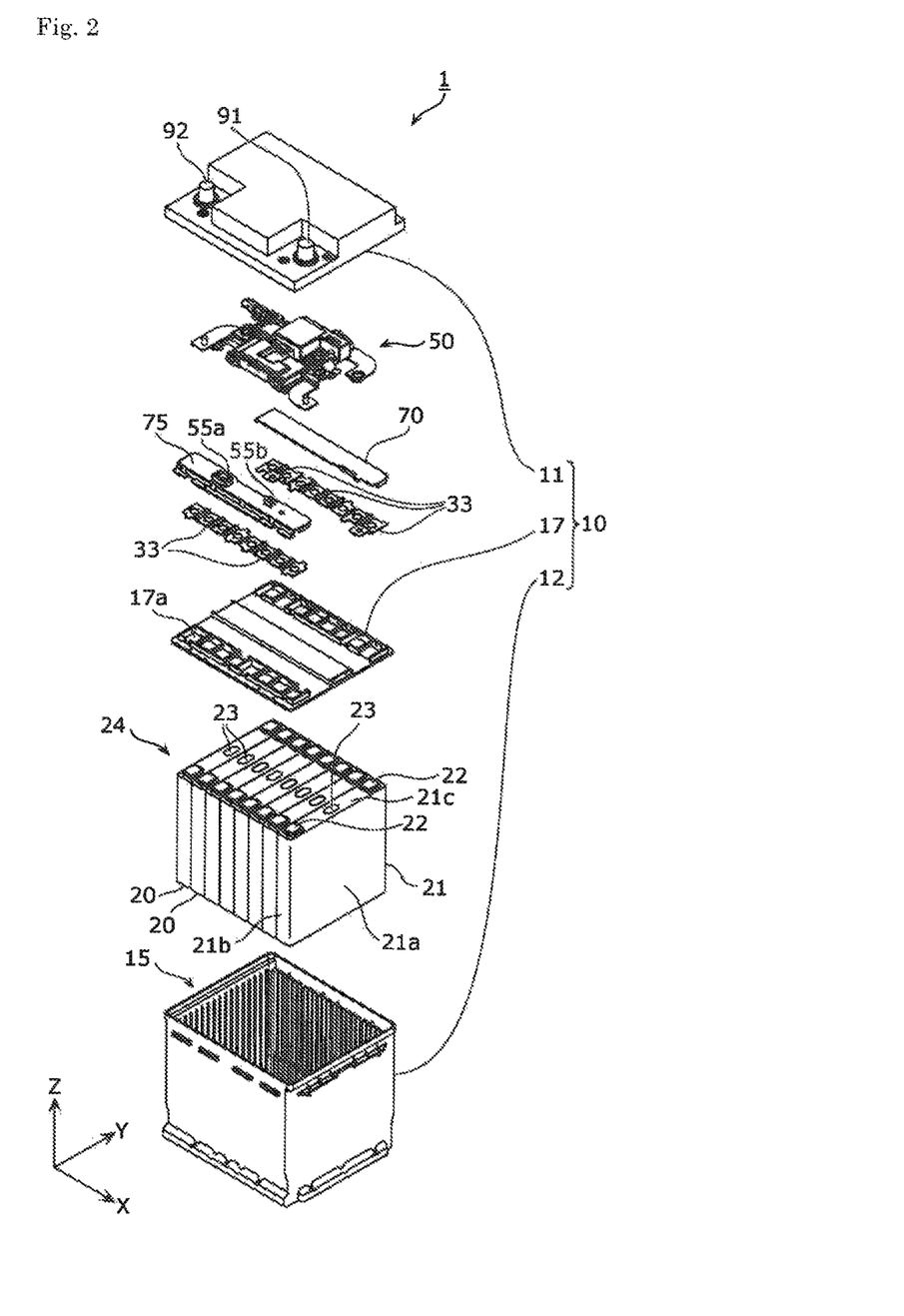
FIG. 2 is an exploded perspective view illustrating each component when the energy storage apparatus according to the embodiment is disassembled.

First, a general description of an energy storage apparatus 1 according to the embodiment will be given with reference to FIGS. 1 and 2. FIG. 1 is a perspective view illustrating the appearance of the energy storage apparatus 1 according to the embodiment. FIG. 2 is an exploded perspective view illustrating each component when the energy storage apparatus 1 according to the embodiment is disassembled.

The energy storage apparatus 1 is an apparatus capable of charging electricity from the outside and discharging electricity to the outside and has a substantially rectangular parallelepiped shape in the present embodiment. The energy storage apparatus 1 is a battery module (assembled battery) used for power storage application, power supply application, or the like. Specifically, the energy storage apparatus 1 is used as a battery or the like for driving or starting an engine of a moving body such as an automobile, a motorcycle, a watercraft, a ship, a snowmobile, an agricultural machine, a construction machine, or a railway vehicle for electric railways. Examples of the automobile include an electric vehicle (EV), a hybrid electric vehicle (HEV), a plug-in hybrid electric vehicle (PHEV), and a gasoline vehicle. Examples of the railway vehicle for electric railways include a train, a monorail, and a linear motor car. The energy storage apparatus 1 can also be used as a stationary battery or the like used for home use, a generator, or the like.

As illustrated in FIG. 1 and FIG. 2, the energy storage apparatus 1 includes energy storage devices 20 and an outer case 10 that houses the energy storage devices 20. In the present embodiment, eight energy storage devices 20 are housed in the outer case 10. The number of energy storage devices 20 included in the energy storage apparatus 1 is not limited to eight. The energy storage apparatus 1 may include at least one energy storage device 20. In the present embodiment, one energy storage device unit 24 is formed of the plurality of energy storage devices 20 arranged in the X-axis direction and a plurality of busbars 33 that connect the plurality of energy storage devices 20. The energy storage device unit 24 may include a spacer, an insulating film, and the like (not illustrated).

The outer case 10 includes a body 12 for housing the energy storage device unit 24 and a lid body 11 that is disposed to cover an upper portion of a busbar plate 17 disposed above the energy storage device unit 24. The outer case 10 is a case (module case) having a rectangular shape (box shape) that forms an outer shell of the energy storage apparatus 1. That is, the outer case 10 is a member that fixes the energy storage device unit 24, the busbar plate 17, and the like at predetermined positions and protects these members from an impact or the like. The outer case 10 is formed of, for example, an insulating member such as polycarbonate (PC), polypropylene (PP), polyethylene (PE), polystyrene (PS), a polyphenylene sulfide resin (PPS), polyphenylene ether (PPE (including modified PPE)), polyethylene terephthalate (PET), polybutylene terephthalate (PBT), polyether ether ketone (PEEK), tetrafluoroethylene-perfluoroalkyl vinyl ether (PFA), polytetrafluoroethylene (PTFE), polyethersulfone (PES), an acrylonitrile butadiene styrene (ABS) resin, or a composite material thereof, or an insulation-coated metal.

The lid body 11 included in the outer case 10 is a rectangular member for closing a body opening 15 of the body 12 and includes a positive-electrode-side external terminal 91 and a negative-electrode-side external terminal 92. The external terminals 91, 92 are electrically connected to the plurality of energy storage devices 20 via a connection unit 50 and the busbars 33, and the energy storage apparatus 1 charges electricity from the outside and discharges electricity to the outside via the external terminals 91, 92. The external terminals 91, 92 are each formed of, for example, a conductive member made of metal such as aluminum or an aluminum alloy.

The body 12 is a bottomed rectangular cylindrical housing (casing) in which the body opening 15 for housing the energy storage device unit 24 is formed.

The energy storage device 20 is a secondary battery (battery cell) capable of charging and discharging electricity and is specifically a nonaqueous electrolyte secondary battery such as a lithium ion secondary battery. The energy storage device 20 has a flat rectangular parallelepiped (prismatic) shape, and in the present embodiment, eight energy storage devices 20 are arranged in the X-axis direction as described above.

The energy storage device 20 is not limited to the nonaqueous electrolyte secondary battery, but may be a secondary battery except for the nonaqueous electrolyte secondary battery, or may be a capacitor. The energy storage device 20 may be a primary battery that can use stored electricity without being charged by a user. The energy storage device 20 may be a battery using a solid electrolyte. Although the energy storage device 20 having a rectangular parallelepiped shape (prismatic shape) is illustrated in the present embodiment, the shape of the energy storage device 20 is not limited to the rectangular parallelepiped shape but may be a polygonal columnar shape, a cylindrical shape, an oval columnar shape, or the like except for the rectangular parallelepiped shape. Further, a pouch-type energy storage device may be provided in the energy storage apparatus 1 as the energy storage device 20.

In the present embodiment, the energy storage device 20 includes a case 21 made of metal. The case 21 is a prismatic case having a pair of long side surfaces 21a facing each other and a pair of short side surfaces 21b facing each other. An electrode assembly, a current collector, an electrolyte solution, and the like are housed in the case 21. In the present embodiment, the plurality of energy storage devices 20 are arranged in a row in the X-axis direction in a posture where the long side surfaces 21a are directed in the X-axis direction (a posture where the short side surfaces 21b are parallel to the X-axis direction).

An electrode terminal 22 (positive electrode terminal and negative electrode terminal) made of metal and electrically connected to the electrode assembly inside the case 21 is provided on a lid plate 21c of the case 21. The electrode terminal 22 (positive electrode terminal and negative electrode terminal) is disposed to protrude from the lid plate 21c of the case 21 toward the busbar plate 17 (upward, that is, toward the plus side in the Z-axis direction). The lid plate 21c of the case 21 is further provided with a gas release valve 23 for releasing the gas inside the case 21 to the outside.

The busbar 33 is a rectangular plate-shaped member that is disposed on at least two energy storage devices 20 in a state of being held on the busbar plate 17 and electrically connects the electrode terminals 22 of at least two energy storage devices 20 to each other. The material of the busbar 33 is not particularly limited but may be formed of a metal such as aluminum, an aluminum alloy, copper, a copper alloy, stainless steel, or a combination thereof, or a conductive member except for metal. In the present embodiment, by using five busbars 33, two energy storage devices 20 each are connected in parallel to form four sets of energy storage device groups, and the four sets of energy storage device groups are connected in series. There is no particular limitation in the aspect of the electrical connection of the eight energy storage devices 20, and all of the eight energy storage devices 20 may be connected in series by seven busbars.

The busbar plate 17 is an example of a plate-shaped member disposed to partition the electric device and the energy storage device unit from each other. In the present embodiment, the busbar plate 17 is a resin member that holds the busbars 33. More specifically, the busbar plate 17 is a member that holds the plurality of busbars 33, a connection unit 50, and other wiring and the like (not illustrated in FIG. 2), and can perform position restriction and the like of these members. The busbar plate 17 is provided with a plurality of busbar openings 17a that respectively hold the plurality of busbars 33 and expose a part of each of the plurality of busbars 33 to the plurality of energy storage devices 20 side. The plurality of busbars 33 are covered with busbar covers 70, 75. The busbar plate 17 configured as described above is fixed to the body 12 of the outer case 10 by a predetermined method such as adhesion or heat welding.

Each of the busbar covers 70, 75 is an example of an opening cover and is a resin member that covers the plurality of busbars 33 from above. The busbar covers 70, 75 play a role of electrically insulating the plurality of busbars 33 and the connection unit 50 from each other. As the resin that is the material of each of the busbar plate 17 and the busbar covers 70, 75, PC, PP, PE, PS, or the like is exemplified similarly to the outer case 10.

The connection unit 50 is a unit including the plurality of busbars, the electric device, and the like, and electrically connects the energy storage device unit 24 and the external terminals 91, 92. An electric wire through which a current for control, detection, or the like flows is connected to the electric device included in the connection unit 50. The energy storage apparatus 1 according to the present embodiment has a configuration (in the present embodiment, restriction parts 55a, 55b illustrated in FIG. 2) in which the electric wire connected to the electric device is restricted in a predetermined posture in a state where the connection unit 50 is disposed on the busbar plate 17. Hereinafter, a configuration for controlling the posture of the electric wire in the energy storage apparatus 1 of the embodiment will be described with reference to FIGS. 3 to 6.

[2. Configuration of Connection Unit and Periphery Thereof]

Figure 3:
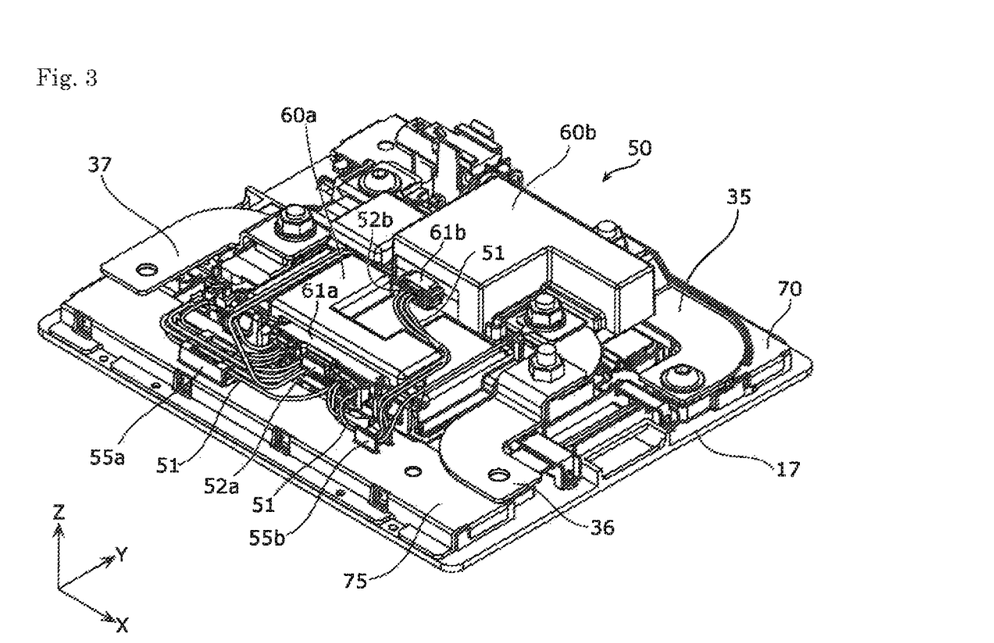
FIG. 3 is a perspective view of a connection unit according to the embodiment.
Figure 4:
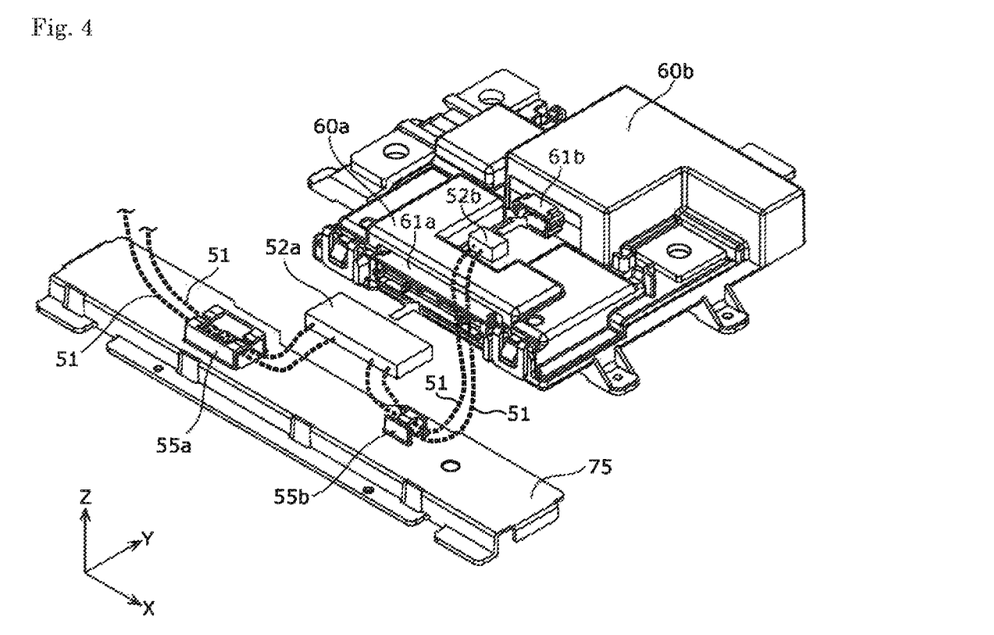
FIG. 4 is a perspective view illustrating a structural relationship between an electric device and an electric wire according to the embodiment.

FIG. 3 is a perspective view of the connection unit 50 according to the embodiment. FIG. 3 illustrates a state in which the connection unit 50 is disposed on the busbar plate 17. FIG. 4 is a perspective view illustrating a structural relationship between electric devices 60a, 60b and electric wires 51 according to the embodiment. In FIG. 4, in order to clearly show the structural relationship, a state is illustrated where the electric wire 51 is removed from each of the electric devices 60a, 60b, and the busbar cover 75 having the restriction parts 55a, 55b is moved to the minus side in the Y-axis direction. In FIG. 4, the approximate postures of four electric wires 51 of the plurality of electric wires 51 are represented by thick dotted lines, and the connectors 52a, 52b are simply illustrated.

Figure 5:
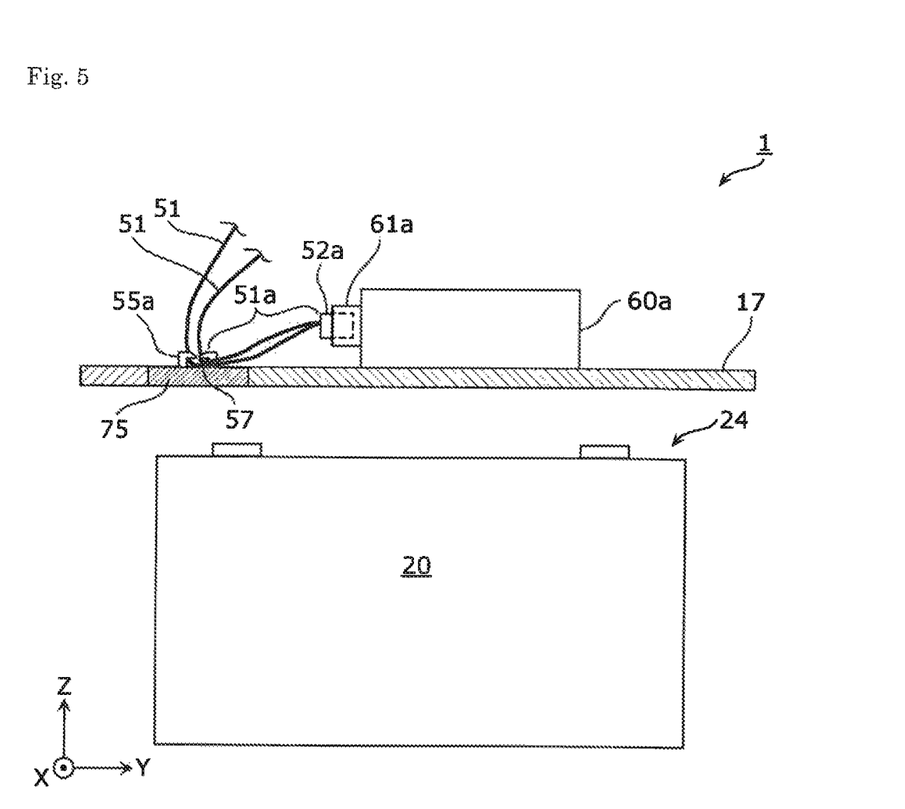
FIG. 5 is a side view illustrating a posture of an electric wire connected to the electric device according to the embodiment.
Figure 6:
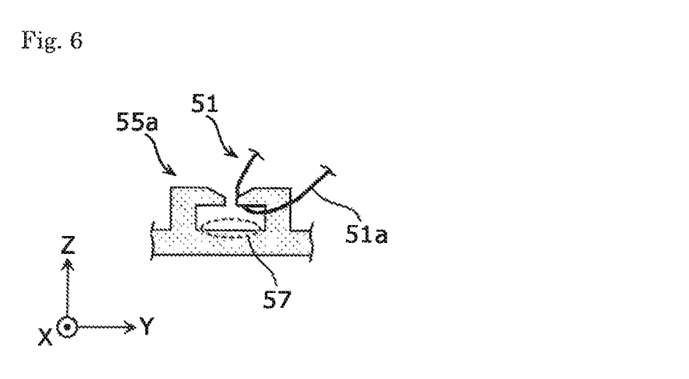
FIG. 6 is a cross-sectional view illustrating a configuration of a restriction part according to the embodiment.

FIG. 5 is a side view (a view seen from the X-axis direction) illustrating the posture of the electric wire 51 connected to electric device 60a according to the embodiment. In FIG. 5, in order to clearly illustrate the posture of the electric wire 51, the configuration of the energy storage apparatus 1 is simply and schematically illustrated, and the cross sections of the busbar plate 17 and the busbar cover 75 are illustrated. FIG. 6 is a cross-sectional view illustrating the configuration of the restriction part 55a according to the embodiment.

As illustrated in FIG. 3, the connection unit 50 includes various members fixed onto the busbar plate 17. Specifically, the connection unit 50 includes electric devices 60a, 60b, a plurality of electric wires 51 connected to each of the electric devices 60a, 60b, and busbars 35 to 37. The electric device 60a is fixedly disposed on the busbar plate 17. The electric device 60b is disposed to be placed on the electric device 60a.

In the present embodiment, the electric device 60a is, for example, a control device called a battery management unit (BMU), and detects a voltage of each of the plurality of energy storage devices 20, a temperature of the energy storage device unit 24 (cf. FIG. 2), and the like to control the states of charge of the plurality of energy storage devices 20. Therefore, a plurality of electric wires 51 for voltage detection and temperature detection are connected to the electric device 60a. An electric wire 51 for exchanging information with a high-order control device is also connected to the electric device 60a.

In the present embodiment, the electric device 60b is, for example, a relay unit having an electromagnetic switch and has a function of switching on and off of the charge or discharge of the energy storage apparatus 1. The electric device 60b operates in accordance with a control signal from electric device 60a. Thus, a plurality of electric wires 51 for exchanging signals with the electric device 60a are connected to the electric device 60b. The positive electrode (total positive terminal) of the energy storage device unit 24 is electrically connected to the external terminal 91 (cf. FIG. 1) on the positive electrode side via the busbar 35, the electric device 60b, and the busbar 36. The negative electrode (total negative terminal) of the energy storage device unit 24 is electrically connected to the external terminal 92 (cf. FIG. 1) on the negative electrode side via the electric device 60a and the busbar 37.

In the connection unit 50 configured as described above, the plurality of electric wires 51 connected to the electric device 60a are connected to the electric device 60a via the connector 52a, and the plurality of electric wires 51 connected to the electric device 60b are connected to the electric device 60b via the connector 52b.

Specifically, as illustrated in FIG. 4, the connector 52a is provided at the end of the plurality of electric wires 51 connected to the electric device 60a, and the connector 52a is inserted into a socket 61a included in the electric device 60a. Thereby, the plurality of electric wires 51 are electrically connected to the electric device 60a. The connector 52b is provided at the end of the plurality of electric wires 51 connected to the electric device 60b, and the connector 52b is inserted into a socket 61b included in the electric device 60b. Thereby, the plurality of electric wires 51 are electrically connected to the electric device 60b.

As described above, the electric wire 51 has been adopted as a conductive member for electrically connecting each of the electric devices 60a, 60b to another member. The electric wire 51 is a linear conductor made of copper, a copper alloy, aluminum, an aluminum alloy, or the like, which is coated with an insulator such as resin, and is a member called an "insulated electric wire", for example. The electric wire 51 has high flexibility, and the length thereof is easily adjusted, so that the electric wires 51 is easily disposed in a layout corresponding to the placement position, shape, and the like of the electric devices 60a, 60b, the busbar plate 17, and the like. However, since the electric wire 51 has high flexibility, a portion close to the connector 52a or 52b can take various postures. Thus, when dew condensation occurs on the electric wire 51 due to a change in the environmental temperature of the energy storage apparatus 1 or the like, a water droplet penetrates into the connector 52a or 52b along the electric wire 51, which may cause a defect of the electric device 60a or 60b.

Therefore, in the energy storage apparatus 1 according to the present embodiment, the restriction parts 55a, 55b are each provided to restrict a portion of the electric wire 51 protruding from the connector 52a to a posture inclined downward from the connector 52a. The restriction part 55b also serves to restrict a portion protruding from the connector 52b to a posture inclined downward from the connector 52a. Hereinafter, in order to describe the configurations, effects, and the like of the restriction parts 55a, 55b, a description of these will be given focusing on the electric device 60a and the restriction part 55a.

As illustrated in FIG. 5, the energy storage apparatus 1 according to the present embodiment includes the energy storage device unit 24 having at least one energy storage device 20, the electric device 60a electrically connected to the energy storage device unit 24, the electric wire 51, and the restriction part 55a. The electric wire 51 is connected to the electric device 60a via the connector 52a. The restriction part 55a restricts the posture of the protruding portion 51a, which is the portion of the electric wire 51 protruding from the connector 52a, to the posture inclined downward from the connector 52a. Specifically, as illustrated in FIG. 6, the restriction part 55a according to the present embodiment hooks the electric wire 51 by a pair of claws facing each other with a gap through which the electric wire 51 can pass, whereby the posture of the protruding portion 51a is set to the posture inclined downward from the connector 52a.

With this configuration, for example, even when dew condensation occurs in the energy storage apparatus 1, and a water droplet adheres to the electric wire 51, it is difficult for the water droplet to reach the connector 52a. As a result, the possibility of the occurrence of a defect due to water entering the connector 52a is reduced.

Of course, by connecting the connector 52a to the electric device 60a in a posture in which the protruding direction of the electric wire 51 faces downward, it is possible to prevent a water droplet traveling along the electric wire 51 from approaching the connector 52a. However, such a configuration is difficult to achieve in consideration of a layout of the electric device 60a and the like inside the outer case 10, and even when such a configuration is achieved, a useless space increases inside the outer case 10. With respect to this point, according to the energy storage apparatus 1 of the present embodiment, the protruding portion 51a of the electric wire 51 can be restricted in the downward posture from the connector 52a without depending on the posture of the connector 52a. It is thus possible to make it difficult for a water droplet traveling along the electric wire 51 to reach the connector 52a, without changing the layout of the electric device 60a or the like. As a result, the occurrence of a defect caused by dew condensation generated inside the energy storage apparatus 1 is reduced. As described above, according to the energy storage apparatus 1 of the present embodiment, the reliability can be improved.

In the present embodiment, the protruding portion 51a is a portion of the electric wire 51 from the connector 52a by several cm (e.g., about 1 cm to 3 cm). That is, the position of the portion of the electric wire 51 several cm ahead of the connector 52a is restricted by the restriction part 55a, so that the protruding portion 51a as a whole is in the posture inclined downward from the connector 52a even when, for example, a several-mm portion of the electric wires 51 in the immediate vicinity of the connector 52a is directed horizontally. Thereby, a water droplet attached to the protruding portion 51a and a water droplet traveling along the electric wire 51 from a position farther than the protruding portion 51a to the protruding portion 51a cannot substantially reach the connector 52a. As a result, the possibility that water enters the connector 52a is reduced.

In the present embodiment, the plurality of electric wires 51 are connected to the electric device 60a via the connector 52a, and the restriction part 55a collectively restricts the posture of the protruding portion 51a of each of the plurality of electric wires 51 to the posture inclined downward.

With this configuration, when dew condensation occurs in the energy storage apparatus 1, it is possible to prevent water droplets, which tend to become large due to the gathering of the electric wires 51, from approaching the connector 52a along these electric wires 51. Therefore, in a state where the plurality of electric wires 51 are connected to one connector 52a, the possibility of the occurrence of a defect caused by dew condensation can be reduced with a simple configuration.

In the present embodiment, as illustrated in FIGS. 5 and 6, a water reception part 57 made of a non-metal is disposed below the end of the protruding portion 51a of the electric wire 51 on the opposite side to the connector 52a. Specifically, the water reception part 57 made of a non-metal is disposed below the end of the electric wire 51 on the opposite side to the connector 52a in the protruding portion 51a (cf. FIG. 5) which is a portion from the connector 52a to a position restricted by the restriction part 55a.

With this configuration, when a water droplet adheres to the protruding portion 51a of the electric wire 51, and the water droplet moves along the protruding portion 51a in the posture inclined downward and falls from the electric wire 51, the water droplet is received by the non-metallic water reception part 57. That is, a water droplet dropped from the electric wire 51 is prevented from coming into contact with the metal member such as the busbar 33 (cf. FIG. 2) located below the restriction part 55a. Accordingly, in the inside of the energy storage apparatus 1, the possibility of corrosion of the metal member caused by water droplets is reduced. This also contributes to an improvement in the reliability of the energy storage apparatus 1.

In the present embodiment, a portion of the electric wire 51 below a portion where the movement is directly restricted by the restriction part 55a is a part of the busbar cover 75 and is a resin portion such as PC, PP, PE, or PS. That is, the water reception part 57 according to the present embodiment is formed of resin. The water reception part 57 may be made of a non-metal at a portion in contact with water. For example, the water reception part 57 may be formed of a metal member with a resin-coated surface. A member having water absorbency, such as a nonwoven fabric, may be provided in the water reception part 57 so as to prevent a water droplet having fallen on the water reception part 57 from moving to other parts. The water reception part 57 may be achieved by a component separate from the busbar cover 75.

In the present embodiment, the energy storage apparatus 1 includes the busbar plate 17 disposed to partition the electric device 60a and the energy storage device unit 24 from each other, and the busbar cover 75 covering the busbar opening 17a that is formed in the busbar plate 17 and that exposes a part of the energy storage device unit 24. The restriction part 55a is disposed on a surface of the busbar cover 75 on the electric device 60a side.

With such a configuration, the busbar cover 75 is provided with the restriction part 55a, and hence the restriction part 55a can be stably fixed in the inside of the energy storage apparatus 1. It is possible to do work of joining the busbar 33 to the electrode terminal 22 via the busbar opening 17a and further to dispose the electric wire 51 restricted in the posture for reducing the defect by using the space used in the joining work. The busbar cover 75 may be attached to the busbar plate 17 in a detachable state by engagement, screwing, or the like, or may be attached to the busbar plate 17 in a substantially non-detachable state by adhesion, welding, or the like. That is, the busbar cover 75 may cover the busbar opening 17a so as to be openable or may cover the busbar opening 17a in a state where the busbar opening is not openable.

In the present embodiment, the energy storage apparatus 1 includes a plurality of electric devices, and the electric wire 51 is disposed to connect two of the plurality of electric devices. Specifically, as illustrated in FIGS. 2 to 4, the energy storage apparatus 1 includes a plurality of electric devices (electric devices 60a, 60b) disposed above the energy storage device unit 24. One or more electric wires 51 of the plurality of electric wires 51 included in the energy storage apparatus 1 connect the electric device 60a and the electric device 60b.

With this configuration, the posture of the electric wire connecting the plurality of electric devices to each other is restricted by the restriction part. In the present embodiment, the electric device 60a, which is a BMU, and the electric device 60b, which is a relay unit disposed above the energy storage device unit 24, are connected by the electric wire 51, and the posture of the electric wire 51 is restricted by a restriction part 55b. That is, one restriction part 55b can reduce the arrival of water droplets at the connectors 52a, 52b respectively connected to the two electric devices 60a, 60b. Therefore, the connectors 52a, 52b and the electric devices 60a, 60b can be efficiently protected from water droplets with a simple configuration.

The vertical positions of the two electric devices connected by the electric wires 51 may be on either side. The positions of the two electric devices in the vertical direction may be the same. For example, the electric devices 60a, 60b connected by one or more electric wires 51 may be arranged on the busbar plate 17 in the X-axis direction or the Y-axis direction.

In the above, the energy storage apparatus 1 according to the embodiment has been described focusing particularly on the electric device 60a and the restriction part 55a, but the description is also applied to the restriction part 55b and the electric device 60b. That is, as illustrated in FIGS. 3 and 4, the protruding portions 51a of some electric wires 51 of the plurality of electric wires 51 connected to the electric device 60a via the connector 52a are each restricted in a posture facing downward from the connector 52a by the restriction part 55b. Therefore, even when water droplets adhere to these electric wires 51, it is difficult for the water droplets to reach the connector 52a. The electric wire 51 is connected to the electric device 60b via the connector 52b. The restriction part 55b can restrict the posture of the protruding portion 51a, which is the portion of the electric wire 51 protruding from the connector 52a, to the posture inclined downward from the connector 52a. Thus, even when a water droplet adheres to the electric wire 51 connected to the electric device 60b, it is difficult for the water droplet to reach the connector 52b. As described above, in the present embodiment, the protruding portion 51a of one or more electric wires 51 connected to each of the electric devices 60a, 60b is in a posture inclined downward from connector 52a or 52b so as to reduce the possibility of water entering connector 52a or 52b.

The restriction part 55a may be a separate component from the busbar cover 75, and in this case, the restriction part 55a may be attached to the busbar cover 75 by adhesion, welding, fitting, or the like. In the present embodiment, the restriction parts 55a, 55b restrict the posture of the protruding portion 51a by hooking the electric wire 51, but the configuration for restricting the posture of the protruding portion 51a is not limited thereto. For example, the restriction part, which is an annular member, may restrict the posture of the protruding portion 51a by restraining the electric wire 51 to another member such as the busbar cover 75.

The position where the restriction part is disposed is also not particularly limited, and for example, the restriction part may be disposed above the electric device 60a. Therefore, a configuration example in a case where the restriction part is provided in a member disposed above electric device 60a will be described as a modification of the embodiment with a focus on a difference from the embodiment.

(Modification)

Figure 7:
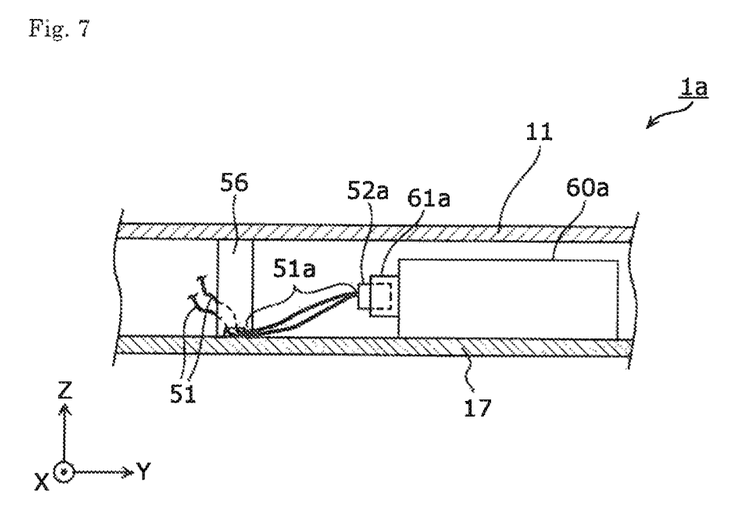
FIG. 7 is a side view illustrating a posture of an electric wire connected to an electric device according to a modification of the embodiment.

FIG. 7 is a side view illustrating a posture of the electric wire 51 connected to the electric device 60a according to the modification of the embodiment. In FIG. 7, the cross sections of the busbar plate 17 and the lid body 11 are illustrated, and the illustration of other members such as the energy storage device unit 24 is omitted.

An energy storage apparatus 1a according to the present modification includes a restriction part 56 that restricts the posture of the protruding portion 51a of the electric wire 51. Specifically, the energy storage apparatus 1a includes the lid body 11 that is a cover member covering the electric device 60a and the electric wire 51 from above. The restriction part 56 is disposed on the lid body 11 and restricts the posture of the protruding portion 51a to a posture inclined downward by pressing the protruding portion 51a of the electric wire 51 from above.

With this configuration, the posture of the protruding portion 51a of the electric wire 51 is restricted to the posture inclined downward from the connector 52a by the work of placing the lid body 11. That is, the posture of the protruding portion 51a can be restricted to a posture that reduces the possibility of water entering the connector 52a only by disposing the lid body 11 on the body 12 that houses the energy storage device unit 24, the busbar plate 17, the connection unit 50, and the like. That is, it is possible to obtain an effect of reducing the occurrence of a defect caused by dew condensation in the energy storage apparatus 1 by the work of placing the lid body 11.

FIG. 7 illustrates the restriction part 56 that restricts the posture of the protruding portion 51a of the electric wire 51 connected to the connector 52a. However, the protruding portion 51a of the electric wire 51 connected to the connector 52b may be similarly restricted in a posture facing downward from the connector 52b by the restriction part provided on the lid body 11.

OTHER EMBODIMENTS

The energy storage apparatus according to the present invention has been described based on the embodiment and the modification thereof. However, the present invention is not limited to the above embodiment and modification. Various modifications made by those skilled in the art to the above embodiments or modification are also included in the scope of the present invention so long as the modifications do not deviate from the gist of the present invention.

The restriction parts 55a, 55b may not restrict the postures of the protruding portions 51a of all the electric wires 51 connected to the electric devices 60a, 60b. Each of the restriction parts 55a, 55b may have a posture in which the protruding portion 51a of at least one electric wire 51 is inclined downward from the connector 52a or 52b connected to the protruding portion 51a. Thus, regarding at least the one electric wire 51, the occurrence of a defect due to a water droplet traveling along the electric wire 51 is reduced. Only one of the restriction parts 55a, 55b may be disposed. Thus, regarding one or more electric wires 51 with the postures thereof restricted by the restriction part 55a or 55b, the occurrence of a defect due to a water droplet traveling along each of the one or more electric wires 51 is reduced.

The restriction parts 55a, 55b may not be provided in the busbar cover 75. For example, the restriction part may be provided on the busbar plate 17. Depending on the placement position of the electric device 60a or 60b, the restriction part can also be provided on the body 12 of the outer case 10.

Although the electric devices 60a, 60b have been the control device and the relay unit, the type of the electric device to which the electric wire is connected via the connector is not particularly limited. In a case where the energy storage apparatus 1 includes a communication module that performs wireless communication or wired communication, the energy storage apparatus 1 may include a restriction part that puts the protruding portion of the electric wire, connected to the communication module via the connector, into a posture facing downward from the connector. That is, when the electric wire is connected to the electric device via the connector regardless of the number, type, size, position, or the like of the electric devices, the possibility of the occurrence of a defect of the electric device caused by dew condensation is reduced by including a restriction part that puts the protruding portion of the electric wire into a posture facing downward from the connector.

A form constructed by arbitrarily combining the plurality of components described above is also included in the scope of the present invention.

INDUSTRIAL APPLICABILITY

The present invention can be applied to an energy storage apparatus including an energy storage device such as a lithium ion secondary battery.

DESCRIPTION OF REFERENCE SIGNS 1, 1a: energy storage apparatus
11: lid body
17: busbar plate
17a: busbar opening
20: energy storage device
24: energy storage device unit
33, 35, 36, 37: busbar
50: connection unit
51: electric wire
51a: protruding portion
52a, 52b: connector
55a, 55b, 56: restriction part
57: water reception part
60a, 60b: electric device
61a, 61b: socket
70, 75: busbar cover
91, 92: external terminal

The invention claimed is:

1. An energy storage apparatus comprising:
an energy storage device unit including at least one energy storage device;
an electric device electrically connected to the energy storage device unit;
an electric wire connected to the electric device via a connector; and
a restriction part that restricts a posture of a protruding portion of the electric wire, the protruding portion being a portion protruding from the connector, to a posture inclined downward from the connector and the restricting part is arranged below the connector.

2. The energy storage apparatus according to claim 1, wherein a plurality of the electric wires are connected to the electric device via the connector, and the restriction part collectively restricts a posture of the protruding portion of each of the plurality of electric wires to a posture inclined downward.

3. The energy storage apparatus according to claim 1, wherein a water reception part made of a non-metal is disposed below an end of the protruding portion of the electric wire on a side opposite to the connector.

4. The energy storage apparatus according to claim 1, further comprising
a cover member that covers the electric device and the electric wire from above,
wherein the restriction part is disposed on the cover member and presses the protruding portion of the electric wire from above to restrict the posture of the protruding portion to a posture inclined downward.

5. The energy storage apparatus according to claim 1, further comprising:
a plate-shaped member disposed to partition the electric device and the energy storage device unit from each other; and
an opening cover covering an opening that is formed in the plate-shaped member and that exposes a part of the energy storage device unit,
wherein the restriction part is disposed on a surface of the opening cover on a side of the electric device.

6. The energy storage apparatus according to claim 1, wherein
the energy storage apparatus includes a plurality of the electric devices, and
the electric wire is disposed to connect two of the plurality of the electric devices.

7. The energy storage apparatus according to claim 1, wherein the restricting part has a space below the restricting part for passing the electric wire through.

8. The energy storage apparatus according to claim 1, wherein the restricting part has an engagement part for engaging the electric wire.

9. The energy storage apparatus according to claim 1, wherein the restricting part restricts a middle position of the electric wire to the downward direction.

10. The energy storage apparatus according to claim 1, wherein the restricting part hooks a portion of the electric wire inclined to the downward direction from the connector.

11. The energy storage apparatus according to claim 1, wherein the restricting part restricts a predetermined position of the electric wire to incline in the downward direction.

12. The energy storage apparatus according to claim 1, further comprising a water reception part disposed adjacent to the restricting part.

13. An energy storage apparatus comprising:
an energy storage device unit including at least one energy storage device;
an electric device electrically connected to the energy storage device unit;
an electric wire connected to the electric device via a connector; and
a restriction part that restricts a posture of a protruding portion of the electric wire, the protruding portion being a portion protruding from the connector, to a posture inclined downward from the connector,
wherein the restricting part has a space below the restricting part for passing the electric wire through.

14. The energy storage apparatus according to claim 13, wherein the restricting part has an engagement part for engaging the electric wire.

15. The energy storage apparatus according to claim 13, wherein the restricting part restricts a middle position of the electric wire to the downward direction.

16. The energy storage apparatus according to claim 13, wherein the restricting part hooks a portion of the electric wire inclined to the downward direction from the connector.

17. The energy storage apparatus according to claim 13, wherein the restriction part presses the protruding portion of the electric wire from above to restrict the posture of the protruding portion to a posture inclined downward.

18. An energy storage apparatus comprising:
- an energy storage device unit including at least one energy storage device;
- an electric device electrically connected to the energy storage device unit;
- an electric wire connected to the electric device via a connector; and
- a restriction part that restricts a posture of a protruding portion of the electric wire, the protruding portion being a portion protruding from the connector, to a posture inclined downward from the connector, wherein the restricting part is configured with an engagement part for engaging the electric wire.

19. The energy storage apparatus according to claim 18, wherein the restricting part restricts a middle position of the electric wire to the downward direction.

20. The energy storage apparatus according to claim 18, wherein the engaging part hooks a portion of the electric wire inclined to the downward direction from the connector.

* * * * *